United States Patent
Isono

(10) Patent No.: US 8,097,362 B2
(45) Date of Patent: Jan. 17, 2012

(54) ELECTRODE ACTIVE MATERIAL AND MANUFACTURING METHOD OF SAME

(75) Inventor: Motoshi Isono, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 331 days.

(21) Appl. No.: 12/443,238

(22) PCT Filed: Feb. 15, 2008

(86) PCT No.: PCT/IB2008/001092
§ 371 (c)(1),
(2), (4) Date: Mar. 27, 2009

(87) PCT Pub. No.: WO2008/102270
PCT Pub. Date: Aug. 28, 2008

(65) Prior Publication Data
US 2010/0035154 A1    Feb. 11, 2010

(30) Foreign Application Priority Data
Feb. 19, 2007 (JP) .................................. 2007-037878

(51) Int. Cl.
H01M 4/00 (2006.01)
H01M 4/13 (2010.01)
H01M 4/58 (2010.01)
H01M 6/18 (2006.01)
H01M 10/0562 (2010.01)

(52) U.S. Cl. ................ 429/221; 429/218.1; 429/231.95; 429/322

(58) Field of Classification Search ............... 429/218.1, 429/221, 231.95, 322
See application file for complete search history.

(56) References Cited

U.S. PATENT DOCUMENTS

2009/0186277 A1* 7/2009 Beck et al. .................... 429/221
2010/0112446 A1* 5/2010 Okada et al. .................. 429/221

FOREIGN PATENT DOCUMENTS

| | | |
|---|---|---|
| EP | 1 684 370 A1 | 7/2006 |
| EP | 1684370 A1 * | 7/2006 |
| JP | 9-134724 | 5/1997 |
| JP | 2002-117903 | 4/2002 |
| JP | 2005-116393 | 4/2005 |
| JP | 2005-158673 | 6/2005 |
| JP | 2005-276474 | 10/2005 |
| JP | 2005-276476 | 10/2005 |
| WO | WO 02/089233 A3 | 11/2002 |
| WO | WO 2006/057146 A3 | 6/2006 |

OTHER PUBLICATIONS

"Surface Chemistry of LiFePO4 Studied by Mossbauer and X-Ray Photoelectron Spectroscopy and Its Effect on Electrochemical Properties," Young-Ho Rho et al. Journal of the Electrochemical Society, 154 (4), 2007, pp. A283-A289.*

"FTIR features of lithium-iron phosphates as electrode materials for rechargeable lithium batteries," A. Ait Salah et al. Spectrochimica Acta Part A 65 (2006), pp. 1007-1013.*

"Notification of Reasons for Refusal" in Japanese Patent Application No. 2007-037878, filed Feb. 19, 2007 (Drafting date: Dec. 11, 2008).

* cited by examiner

*Primary Examiner* — Patricia L Hailey
(74) *Attorney, Agent, or Firm* — Finnegan, Henderson, Farabow, Garrett & Dunner, LLP

(57) ABSTRACT

Electrode active material of the invention is such that a $Li_3PO_4$ phase is mixed in with an amorphous iron-phosphate complex having a $Li_xFeP_yO_z$ composition. Applying the electrode active material of the invention to a secondary battery inhibits an irreversible reaction which reduces the irreversible capacity, thus enabling a high capacity to be maintained even when it is used at a high potential.

9 Claims, 4 Drawing Sheets

ELECTRODE ACTIVE MATERIAL AND MANUFACTURING METHOD OF SAME

CROSS-REFERENCE TO RELATED APPLICATIONS

This application is a national phase application of International Application No. PCT/IB2008/001092, filed Feb. 15, 2008, and claims the priority of Japanese Application No. 2007-037878, filed Feb. 19, 2007, the contents of both of which are incorporated herein by reference.

BACKGROUND OF THE INVENTION

1. Field of the Invention

The invention relates to electrode active material that can inhibit an irreversible reaction which reduces an irreversible capacity, thus enabling a high capacity to be maintained even when used at a high potential.

2. Description of the Related Art

A lithium-ion secondary battery is a classic example of a secondary battery that charges and discharges by cations such as lithium ions traveling between electrodes. Material that can absorb and release lithium ions can be used for the electrode active material of such a secondary battery. One example of such a material is carbonaceous material such as graphite which is an example of negative electrode active material. On the other hand, an example of positive electrode active material is an oxide which has lithium and a transition metal as constituent elements, such as lithium nickel oxide or lithium cobalt oxide (hereinafter, such an oxide may also be referred to as a "lithium-containing composite oxide"). Moreover, in recent years, chemical compounds having an olivine structure, e.g., chemical compounds represented by the general expression $LiMPO_4$ (M=Mn, Fe, Co, Cu, V), are promising materials for positive electrode active material due in part to their large theoretical capacity.

Meanwhile, Japanese Patent Application Publication No. 2005-158673 (JP-A-2005-158673) describes electrode active material which mainly consists of an amorphous metal-phosphate complex that includes an olivine structure. With the electrode active material that mainly consists of the metal-phosphate complex, an amorphous body can be synthesized from an inexpensive metal oxide at an extremely low cost and in a short period of time by rapid cooling compared with a crystalline body of related art. What is more, the resultant amorphous body seems to display the same battery properties as the crystalline body.

However, when an amorphous metal-phosphate complex is used at a high potential, as it is when used in a vehicle, a side reaction with the electrolyte solution causes an irreversible reaction which results in irreversible capacity, and as a result, sufficient charging and discharging was unable to be performed.

SUMMARY OF THE INVENTION

This invention thus provides electrode active material that can inhibit irreversible reaction which reduces an irreversible capacity, thus enabling a high capacity to be maintained even when it is used at a high potential.

A first aspect of the invention relates to electrode active material in which a $Li_3PO_4$ phase is mixed in with an amorphous iron-phosphate complex having a $Li_xFeP_yO_z$ composition.

According to the first aspect, mixing a $Li_3PO_4$ phase in with an amorphous iron-phosphate complex having a $Li_xFeP_yO_z$ composition inhibits an irreversible reaction with the electrolyte solution. As a result, electrode active material that can effectively reversibly charge and discharge can be obtained.

Also, the amount of the $Li_3PO_4$ phase may be $0<Li_3PO_4<10$ percent by mass. This is because the $Li_3PO_4$ phase works to inhibit an irreversible reaction with the electrolyte solution, but if the content of the $Li_3PO_4$ phase is equal to or greater than 10 percent by mass, the capacity drops below the necessary capacity. Also, a second aspect of the invention relates to electrode active material in which a $Li_3PO_4$ phase is mixed in with a $LiFePO_4$ or $Li_3Fe_2(PO_4)_3$ crystalline iron-phosphate complex.

According to this structure, mixing a $Li_3PO_4$ phase in with a $LiFePO_4$ or $Li_3Fe_2(PO_4)_3$ crystalline iron-phosphate complex inhibits an irreversible reaction with the electrolyte solution. As a result, electrode active material that can maintain a high capacity even when used at a high potential can be obtained.

Also, the amount of the $Li_3PO_4$ phase may be $0<Li_3PO_4<10$ percent by mass. This is because the $Li_3PO_4$ phase works to inhibit an irreversible reaction with the electrolyte solution, but if the content of the $Li_3PO_4$ phase is equal to or greater than 10 percent by mass, the capacity drops below the necessary capacity.

A third aspect of the invention relates to an electrode active material manufacturing method that includes an amorphising step for obtaining an amorphous iron-phosphate complex by rapidly cooling a melt having a $Li_xFeP_yO_z$ composition, and a crystallizing step for crystallizing a $Li_3PO_4$ phase by heat treating the amorphous iron-phosphate complex within a temperature range from a glass transition temperature to a crystallization temperature.

According to this third aspect of the invention, performing these steps makes it possible to more efficiently manufacture material that displays useful properties as electrode active material that inhibits an irreversible reaction with an electrolyte solution and thus can reversibly charge and discharge.

Also, a fourth aspect of the invention relates to a manufacturing method of electrode active material having as a main constituent a crystalline iron-phosphate complex that used a melt having a $Li_xFeP_yO_z$ composition. This manufacturing method includes a melt adjusting step for adjusting the melt such that a composition of the melt is off from a stoichiometric composition, and a crystallizing step for crystallizing a $Li_3PO_4$ phase by slowly cooling the melt.

According to this fourth aspect of the invention, performing these steps makes it possible to more efficiently manufacture material that displays useful properties as electrode active material that can maintain a high capacity even when used at a high potential.

Also, a fifth aspect of the invention relates to a high voltage nonaqueous electrolyte secondary battery that includes the electrode active material described above According to this fifth aspect of the invention, providing the electrode active material that inhibits an irreversible reaction enables a nonaqueous electrolyte secondary battery to be obtained that can maintain a high capacity even when used at a high potential.

This invention makes it possible to obtain electrode active material that can inhibit an irreversible reaction which reduces the irreversible capacity, thus enabling it to maintain a high capacity even when used at a high potential.

BRIEF DESCRIPTION OF THE DRAWINGS

The foregoing and further features and advantages of the invention will become apparent from the following descrip

DETAILED DESCRIPTION OF THE EMBODIMENTS

Figure 1:
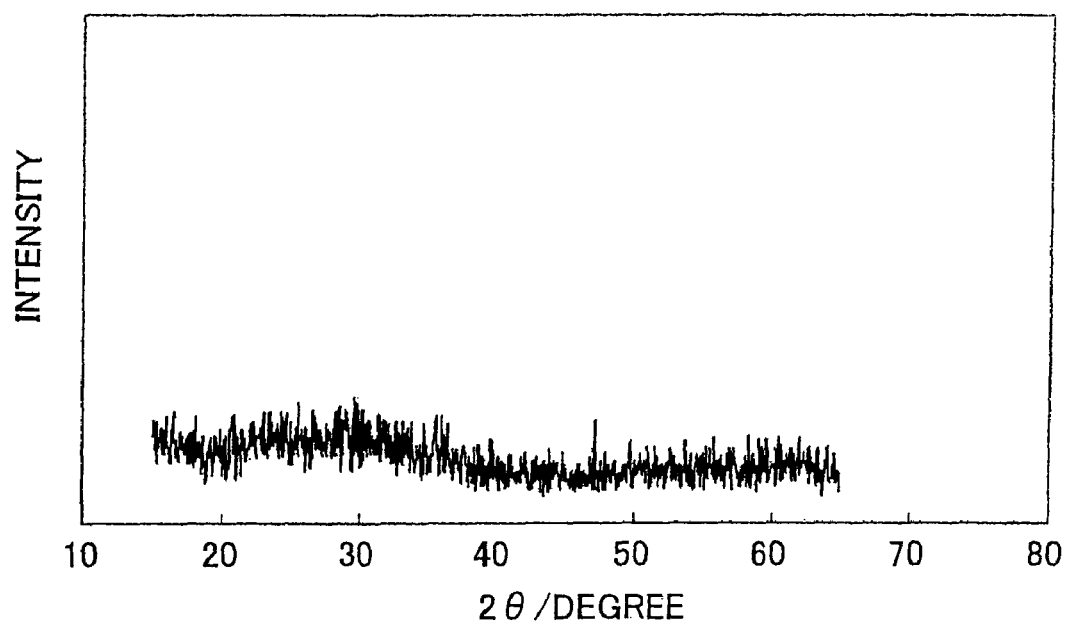
- FIG. 1 is an XRD pattern of electrode active material obtained by Example 1.

Hereinafter, electrode active material and a manufacturing method thereof according to the invention will be described in detail.

First the electrode active material of the invention will be described. The electrode active material of the invention can be divided into two example embodiments, one which is mainly an amorphous iron-phosphate complex (the first example embodiment), and the other which is mainly a crystalline iron-phosphate complex (the second example embodiment). Hereinafter, the electrode active material of the invention will be described in detail divided into these example embodiments.

The electrode active material according to the first example embodiment of the invention is such that a $Li_3PO_4$ phase mixed in with an amorphous iron-phosphate complex having a composition of $Li_xFeP_yO_z$.

According to this example embodiment, having a $Li_3PO_4$ phase mixed in with the amorphous iron-phosphate complex having a composition of $Li_xFeP_yO_z$ enables electrode active material to be obtained which can inhibit the irreversible reaction with the electrolyte solution and thus reversibly charge and discharge. Hereinafter, the electrode active material of this example embodiment will be described in detail for each structure.

First, the iron-phosphate complex having the composition of $Li_xFeP_yO_z$ that is used in this example embodiment will be described.

The iron-phosphate complex of this example embodiment is represented by the following general expression (1):

$$Li_xFeP_yO_z \quad (1)$$

In this general expression (1), x, y, z are values that satisfy $0 \leq x \leq 2$; $0 \leq y \leq 2$; $0 \leq z \leq 7.5$, and preferably $0 \leq x \leq 2$; $0 \leq y \leq 2$; $0 \leq z \leq 7$, respectively. Here, value z in the general expression $Li_xFeP_yO_z$ (1) is a value that is determined by the valence of iron and the values x and y to satisfy stoichiometry, and is expressed by the following equation (2).

$$z=(x+5y+\text{valence 2 or 3 of iron})/2 \quad (2)$$

The valence of iron is 2 when the foregoing iron-phosphate complex is reacted in an inert atmosphere or a reducing atmosphere (simply referred to as a "non-oxidizing environment" in this specification), and is 3 when it is reacted in an oxidizing atmosphere. Therefore, the iron takes on either a valence of 2 or 3 depending on the atmosphere. In this case, z can more specifically be a value that satisfies $1 \leq z \leq 7.5$. In particular, in this invention, the atmosphere is preferably a non-oxidizing atmosphere, i.e., the valence of iron is preferably 2. In this case, z is a value that satisfies $1 \leq z \leq 7$.

In this example embodiment, the iron-phosphate complex with the composition of $Li_xFeP_yO_z$ is an amorphous material. The amorphous iron-phosphate complex may be amorphous to the extent that one or two or more of the following conditions are satisfied. (1) the average crystallite size is equal to or less than approximately 1000 Angstrom (preferably equal to or less than approximately 100 Angstrom, and more preferably equal to or less than 50 Angstrom); (2) the specific gravity of the iron-phosphate complex is large at equal to or greater than approximately 3% (and more preferably equal to or greater than approximately 5%) compared to the specific gravity (theoretical value) when the iron-phosphate complex is completely crystalline; and (3) no peak which supports the iron-phosphate complex being crystalline can be observed in an X-ray diffraction pattern. That is, a classic example of the iron-phosphate complex described here is mainly a lithium iron-phosphate complex that satisfies one or two or more of the foregoing conditions (1) to (3). In this example embodiment, the iron-phosphate complex may be a lithium iron-phosphate complex that satisfies at least condition (3). Incidentally, the X-ray pattern can be obtained using an X-ray diffractometer (XRD) (model number Rigaku RINT 2100 HLR/PC) that may be obtained from Rigaku Corporation, for example.

Next, the $Li_3PO_4$ phase of this example embodiment will be described. The $Li_3PO_4$ phase is mixed in with the amorphous iron-phosphate complex and inhibits a side reaction with the electrolyte solution. That is, the $Li_3PO_4$ crystalline phase is a refractory so it inhibits an irreversible reaction with the electrolyte solution.

The percentage of the $Li_3PO_4$ crystalline phase is within the range of $0<Li_3PO_4<10$ percent by mass, preferably within the range of $0<Li_3PO_4<5$ percent by mass, and more preferably within the range of $0<Li_3PO_4<1$ percent by mass. If the content exceeds that range, the $Li_3PO_4$ crystalline phase itself will not charge and discharge so the capacity decreases to less than the necessary capacity, and as a result, performance as electrode active material may decline.

Incidentally, the use of the electrode active material obtained from this example embodiment is not particularly limited. For example, it may be used as a positive electrode active material of a high voltage nonaqueous electrolyte secondary battery which will be described later.

Next, the second example embodiment of the electrode active material of the invention will be described. The electrode active material of this example embodiment has a $Li_3PO_4$ phase mixed in with a $LiFePO_4$ or $Li_3Fe_2(PO_4)_3$ crystalline iron-phosphate complex.

According to this example embodiment, having a $Li_3PO_4$ phase mixed in with a $LiFePO_4$ or $Li_3Fe_2(PO_4)_3$ crystalline iron-phosphate complex enables electrode active material to be obtained that can maintain a high capacity, even if used at a high potential, by inhibiting the irreversible reaction with the electrolyte solution. Hereinafter, the electrode active material of this example embodiment will be described in detail for each structure.

First, the $LiFePO_4$ or $Li_3Fe_2(PO_4)_3$ crystalline iron-phosphate complex in this example embodiment will be described.

In this example embodiment, the iron-phosphate complex is $LiFePO_4$ crystalline material with an olivine structure or $Li_3Fe_2(PO_4)_3$ crystalline material with a NASICON structure. Of these, the LiFePO$_4$ crystalline material with the olivine structure enables the theoretical capacity to be larger.

The Li$_3$PO$_4$ crystalline material that is mixed in with the foregoing electrode active material of this example embodiment has effects similar to those described in the foregoing first example embodiment so a description of the effects will be omitted here.

Incidentally, the use of the electrode active material obtained from the second example embodiment of the invention is not particularly limited. For example, as in the first example embodiment, it may be used as positive electrode active material of a high voltage nonaqueous electrolyte secondary battery which will be described later.

Next, manufacturing methods of electrode active material according to third and fourth example embodiments will be described. The manufacturing methods of electrode active material of the invention can be classified into two example embodiments, one which is a manufacturing method of mainly an amorphous iron-phosphate complex (the third example embodiment), and the other which is a manufacturing method of mainly a crystalline iron-phosphate complex (the fourth example embodiment). Hereinafter, the manufacturing method of electrode active material of the invention will be described in detail divided into these example embodiments.

First, the manufacturing method of electrode active material of mainly an amorphous iron-phosphate complex according to the third example embodiment of the invention will be described. The manufacturing method of electrode active material of this example embodiment includes i) an amorphising step for obtaining an amorphous iron-phosphate complex by rapidly cooling a melt having a Li$_x$FeP$_y$O$_z$ composition, and ii) a crystallizing step for crystallizing the Li$_3$PO$_4$ by heat treating the amorphous iron-phosphate complex within a temperature range from the glass transition temperature to the crystallization temperature.

According to this third example embodiment, performing these steps makes it possible to more efficiently manufacture material that displays useful properties as electrode active material that inhibits an irreversible reaction with an electrolyte solution and thus can reversibly charge and discharge.

The manufacturing method of electrode active material according to the third example embodiment includes at least the amorphising step and the crystallizing step. Hereinafter, each of these steps will be described in detail.

First, the amorphising step in the third example embodiment will be described. The amorphising step in this example embodiment is a step for obtaining an amorphous iron-phosphate complex by rapidly cooling a melt having a Li$_x$FeP$_y$O$_z$ composition.

The method for rapidly cooling the melt used in this step (i.e., the melt rapid cooling method) is a method for amorphising a metal complex by rapidly solidifying the metal complex from a molten state. For example, a metal complex in a molten state is rapidly solidified by being put into a low temperature medium (such as ice water) so that it solidifies rapidly. More specifically, the single-roll method for rapidly cooling melt may be used, for example.

The melt rapid cooling method includes a process of rapidly solidifying a mixture including Li raw material (such as a Li compound), Fe raw material (such as an Fe oxide), and P raw material (such as a phosphate compound), which corresponds to the Li$_x$FeP$_y$O$_z$. This method may preferably be applied to a lithium iron-phosphate complex or the like.

As the Li raw material used in this step, one or two or more kinds of Li compounds may be used. The Li compound may be, for example, Li$_2$CO$_3$ or LiOH, LiOH being the more preferable. Using this kind of lithium compound enables electrode active material corresponding to a state in which lithium has been absorbed beforehand to be obtained. As a result, the irreversible capacity can be reduced. In addition, the melting point of the mixture can be reduced by selecting a lithium compound that can function as a flux or fusing agent.

Also, as the Fe raw material used in this step, one or two or more kinds of Fe oxides may be used. The Fe oxide may be, for example, FeO or Fe$_2$O$_3$ or the like, FeO being the more preferable.

Also, as the P raw material used in this step, one or two or more kinds of phosphorous compounds may be used. The phosphorous compound may be, for example, phosphorous oxide or phosphorous ammonium salt or the like, P$_2$O$_5$ being preferable.

The average particle diameter and particle diameter distribution and the like of the raw materials used in this step are not particularly limited. Also, generally the raw materials are preferably relatively uniformly mixed, and more preferably almost uniformly mixed. However, the raw material composition is melted once so even if it is not that uniform, it is still possible to manufacture electrode active material with sufficient uniformity for practical use. In this way, the method used in this example embodiment differs from the solid reaction method of the related art in that it suppresses the effects of the nature and uniformity of the raw material composition on the product material and the manufacturing conditions are easy to control.

Next, the crystallization step of this third example embodiment will be described. The crystallization step in this example embodiment is a step for separating out the Li$_3$PO$_4$ phase by heat treating the amorphous electrode active material Li$_x$FeP$_y$O$_z$ obtained by the amorphising step within a temperature range from the glass transition temperature to the crystallization temperature.

Normally the heat treatment in this step is preferably conducted in a non-oxidizing atmosphere such as an inert gas atmosphere of, for example, argon gas or nitrogen (N$_2$), or an atmosphere that includes a reducing gas such as hydrogen gas. Of these, an inert gas atmosphere of argon gas is preferable.

The heating temperature during the heat treatment is within a temperature range from the glass transition temperature of the amorphous electrode active material Li$_x$FeP$_y$O$_z$ to the crystallization temperature thereof. However, within this range the heat treatment is preferably conducted within the temperature range in which the Li$_3$PO$_4$ crystalline phase separates out. More particularly, the heat treatment is preferably conducted within a temperature range in which crystalline phases other than the Li$_3$PO$_4$ crystalline phase, such as the LiFePO$_4$ crystalline phase with the olivine structure, do not separate out. More specifically, the temperature may be within a range from 300 to 500° C., preferably 350 to 450° C., and more preferably 375 to 425° C.

Also, with regard to heating time, heating during the heat treatment is preferably continued until the Li$_3$PO$_4$ crystalline phase separates out. Further, the heating time is kept short enough so that crystalline phases other than the Li$_3$PO$_4$ crystalline phase, e.g., the LiFePO$_4$ with the olivine structure, do not separate out. More specifically, the heating time may be one hour or longer, preferably between 2 and 8 hours, and more preferably between 4 and 6 hours.

Next, the manufacturing method of electrode active material that mainly consists of a crystalline iron-phosphate complex according to the fourth example embodiment of the invention will be described. The manufacturing method of electrode active material of this example embodiment is a method for manufacturing electrode active material that mainly consists of a crystalline iron-phosphate complex using a melt having a $Li_xFeP_yO_z$ composition, and includes i) a melt adjusting step for adjusting melt in which the composition thereof is off from the stoichiometric composition, and ii) a crystallizing step for crystallizing the $Li_3PO_4$ phase by gradually cooling this melt.

According to this fourth example embodiment, performing these steps makes it possible to more efficiently manufacture material that displays useful properties as electrode active material that can maintain a high capacity even when used at a high potential.

The manufacturing method of electrode active material according to the fourth example embodiment includes at least the melt adjusting step and the crystallizing step. Hereinafter, each of these steps will be described in detail.

First, the melt adjusting step in the fourth example embodiment will be described. The melt adjusting step in this example embodiment is a step for adjusting melt so that the $Li_xFeP_yO_z$ composition of the melt is off from the stoichiometric composition.

The melt used in this step may be obtained by preparing a solid raw material composition including Li raw material (such as a Li compound), Fe raw material (such as an Fe oxide), and P raw material (such as a phosphate compound), which corresponds to $Li_xFeP_yO_z$, for example, and then melting that composition (i.e., turning it into a molten state). This method may preferably be applied to a lithium iron-phosphate complex or the like.

Incidentally, the Li, Fe, and P raw materials are the same as those described in the third example embodiment so descriptions thereof will be omitted here.

Also, the average particle diameter and particle diameter distribution and the like of the raw materials used in this step are also the same as those described in the third example embodiment so descriptions thereof will be omitted here.

The melt in this step preferably contains Li, Fe, and P raw materials of which the content ratio is off from the stoichiometric composition (i.e., an atomic ratio of Li:Fe:P=1:1:1). The content ratio of the Li raw material, the Fe raw material, and the P raw material used in this step is, for example, Li:Fe:P=1:0.5 to 1.5:0.5 to 1.5, preferably Li:Fe:P=1:0.6 to 1.4:0.6 to 1.4, and more preferably Li:Fe:P=1:0.7 to 1.3:0.7 to 1.3, as the atomic ratio of Li, Fe, and P.

Next, the crystallizing step in the fourth example embodiment will be described. The crystallizing step in this example embodiment is a step for crystallizing the $Li_3PO_4$ phase by slowly cooling the melt having the $Li_xFeP_yO_z$ composition obtained from the melt adjusting step.

The method for slowly cooling the melt used in this step (i.e., the melt slow cooling method) is a method for crystallizing a metal complex by reducing the temperature of the metal complex relatively slowly from a molten state.

From the viewpoint of manufacturing efficiency and energy cost and the like, the period of time from after the raw material composition obtained by the melt adjusting step is melted (i.e., the melt time) until it starts to be cooled (slowly cooled) is, for example, no more than 24 hours, preferably between 5 minutes and 24 hours, and more preferably between 5 minutes and 6 hours.

Also, from the viewpoint of increasing the uniformity of the object, the time for which the melt is maintained at the maximum temperature is, for example, at least 30 seconds, preferably at least 30 seconds but no more than 2 hours, and more preferably at least 1 minute but no more than 1 hour. Alternatively, the melt may start to be slowly cooled immediately after being heated to the maximum temperature.

The slow cooling may be performed while controlling the temperature profile to a predetermined temperature profile or the melt may be left to cool naturally on its own. The predetermined temperature profile may be one in which the temperature is gradually reduced at a constant rate (temperature reducing rate), one in which the temperature is reduced in stages, or a combination of the two. Of these, a temperature profile in which the temperature is reduced at a constant rate is easy and preferable. In general, a more highly crystallized object tends to be obtained with a slower temperature reducing rate. However, if the temperature reducing rate is too slow, it may reduce manufacturing efficiency. Taking these points into account, the temperature reducing rate is, for example, preferably set to at least 6° C./h, more preferably at least 30° C./h, and even more preferably at least 60° C./h. When the temperature is reduced in stages as well, the average temperature reducing rate from the start of slow cooling until the end of slow cooling is also preferably within these ranges.

Also, the slow cooling is preferably performed at least between the time that the melt is at the maximum temperature, i.e., in a molten state, until it solidifies. For example, the melt is slowly cooled until its temperature is at least no more than 300° C., more preferably no more than 100° C., and more preferably no more than 40° C. or approximately room temperature.

Next, a high voltage nonaqueous electrolyte secondary battery according to a fifth example embodiment of the invention will be described. The high voltage nonaqueous electrolyte secondary battery of the fifth example embodiment includes the electrode active material described above.

According to the fifth example embodiment of the invention, it is possible to obtain a nonaqueous electrolyte secondary battery that can maintain a high capacity, even when used at a high potential, by having the foregoing electrode active material that inhibits an irreversible reaction.

The nonaqueous electrolyte secondary battery according to the fifth example embodiment of the invention is a nonaqueous electrolyte secondary battery that has a positive electrode containing the electrode active material, a negative electrode containing negative electrode active material, and a nonaqueous electrolyte. The nonaqueous electrolyte secondary battery according to the fifth example embodiment of the invention is advantageous in that it can maintain a high capacity even when used at a high potential. Hereinafter, the reason why the nonaqueous electrolyte secondary battery of the fifth example embodiment of the invention has this kind of advantage will be described. The nonaqueous electrolyte secondary battery according to the fifth example embodiment of the invention can inhibit an irreversible reaction with the electrolyte solution during charging by using electrode active material into which the $Li_3PO_4$ crystallization phase described in either the foregoing first or second example embodiment has been mixed as the positive electrode active material. It is presumed that this is because the $Li_3PO_4$ crystallization phase is a refractory. As a result, a nonaqueous electrolyte secondary battery can be obtained that has superior charging and discharging characteristics in which an irreversible reaction can be inhibited such that a high capacity can be maintained even if it is used at a high potential. Hereinafter, the high voltage nonaqueous electrolyte secondary battery of this invention will be described in detail for each structure.

First, the positive electrode used in the fifth example embodiment of the invention will be described. The positive electrode at least has the electrode active material and also normally has a binder to hold the electrode active material.

Any well-known binder may be used. More specifically, the binder may be, for example, polyvinylidene-fluoride (PVDF), polytetrafluoroethylene (PTFE), polyvinylidene-fluoride-hexafluoropropylene copolymer (PVDF-HFP), a fluorine-containing resin such as fluoro-rubber, or a thermoplastic resin such as polypropylene or polyethylene. Also, the content of the binder of the positive electrode layer is, for example, within a range of 1 to 10 percent by mass, and preferably within a range of 3 to 7 percent by mass.

Also, the positive electrode may contain an additive in addition to the positive electrode active material and the binder. A conductive agent, for example, may be used as the additive. More specifically, carbon black, acetylene black, ketjen black, or black lead or the like may be used as the conductive agent.

Next, the negative electrode used in the fifth example embodiment of the invention will be described. When the foregoing electrode active material is used as the positive electrode of the battery, a metal such as lithium (Li), natrium (Na), magnesium (Mg), aluminum (Al), or an alloy thereof, or carbon material that can absorb and release cations, or the like may be used as negative electrode active material for the counter electrode to the positive electrode. Furthermore, the negative electrode also normally has a binder to hold the negative electrode active material.

Also, examples of the binder used in the negative electrode according to the fifth example embodiment of the invention include polyvinylidene-fluoride (PVDF), carboxymethylcellulose (CMC), and styrene-butadiene rubber polymer (SBR).

Further, the negative electrode may also contain an additive in addition to the negative electrode active material and the binder. A conductive agent, for example, may be used as the additive. More specifically, carbon black, acetylene black, ketjen black, or black lead or the like may be used as the conductive agent.

The nonaqueous electrolyte used in the secondary battery according to this fifth example embodiment of the invention may include a nonaqueous solvent and a compound (support electrolyte) that contains cations that can be inserted into and removed from electrode active material. The nonaqueous solvent of the nonaqueous electrolyte may be any of a variety of types of aprotic solvents such as a carbonate, ester, ether, nitrile, sulfone, or lactone type. Examples include propylene carbonate; ethylene carbonate; diethyl carbonate; dimethyl carbonate; ethyl methyl carbonate; 1,2-dimethoxyethane; 1,2-diethoxyethane; acetonitrile; propionitrile; tetrahydrofuran; 2-methyltetrahydrofuran; dioxane; 1,3-dioxolan; nitromethane; N,N-dimethylformamide; dimethylsulfoxide; sulfolane; and γ-butyrolactone. Only one type or a mixture of two or more types of nonaqueous solvent selected from among these nonaqueous solvents may be used. Also, a compound that includes cations that are inserted into/removed from the electrode active material may be used as the support electrolyte that constitutes the nonaqueous electrolyte. For example, with a lithium ion secondary battery, one or two or more types of lithium compounds (lithium salts) such as $LiPF_6$, $LiBF_4$, $LiN(CF_3SO_2)_2$, $LiCF_3SO_3$, $LiC_4F_9SO_3$, $LiC(CF_3SO_2)_3$, and $LiClO_4$ may be used.

The nonaqueous electrolyte secondary battery obtained from the fifth example embodiment of the invention may be any of a variety of shapes, such as coin-shaped, laminated (stacked), or cylindrical. Of these, laminated or cylindrical is preferable.

Also, the nonaqueous electrolyte secondary battery can be used with high voltage, the range of the maximum voltage being within 3.5 to 5.5V, for example, preferably 3.7 to 5.3V, and more preferably 4.5 to 5.5V.

The purpose for which the nonaqueous electrolyte secondary battery is used is not particularly limited. For example, the nonaqueous electrolyte secondary battery may be used in an automobile.

Incidentally, the invention is not limited to the foregoing example embodiments. The foregoing example embodiments illustrate examples. Other examples having substantially the same structure as the technical ideas described within the scope of the claims for patent of the invention and displaying the same operation and effects are also included within the technical scope of the invention. Hereinafter, the invention will be described in even more detail with the following examples.

EXAMPLE 1

LiOH as the Li raw material, FeO as the Fe raw material, and $P_2O_5$ as the P raw material were mixed together at a molar ratio of 2:1:1.5. This mixture was then melted for 1 minute at 1200° C. in an Ar atmosphere and then rapidly cooled with a Cu roll using a single-roll rapid cooling apparatus to obtain amorphous electrode active material $Li_xFeP_yO_z$. The obtained amorphous electrode active material was then heat treated for 5 hours at 400° C. in an Ar atmosphere such that electrode active material in which a $Li_3PO_4$ phase is mixed in with an amorphous iron-phosphate complex having a $Li_xFeP_yO_z$ composition was obtained.

Next, the X-ray diffraction pattern of the obtained electrode active material in which a $Li_3PO_4$ phase is mixed in with an amorphous iron-phosphate complex having a $Li_xFeP_yO_z$ composition was measured under the following conditions. Apparatus used: Rigaku, RAD-X; X-ray: CuKα, 40 kV, 40 mA; scan range: 2θ=10° to 80°. The X-ray diffraction pattern of the electrode active-material after heat treatment that was obtained by these measurements is shown in FIG. 1.

COMPARATIVE EXAMPLE 1

LiOH as the Li raw material, FeO as the Fe raw material, and $P_2O_5$ as the P raw material were mixed together at a molar ratio of 2:1:1.5. This mixture was then melted for 1 minute at 1200° C. in an Ar atmosphere and then rapidly cooled with a Cu roll using a single-roll rapid cooling apparatus to obtain amorphous electrode active material $Li_xFeP_yO_z$.

Figure 2:
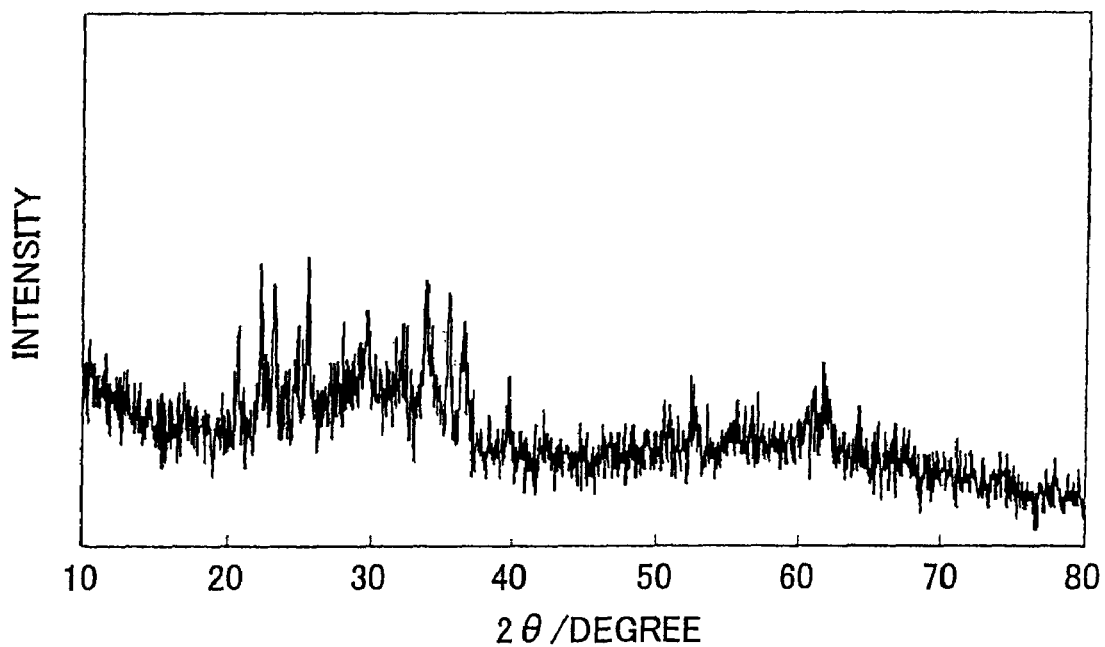
FIG. 2 is an XRD pattern of electrode active material obtained by Comparative example 1.

The X-ray diffraction pattern of the obtained electrode active material $Li_xFeP_yO_z$ was then measured under the same conditions as those in Example 1 above. The X-ray diffraction pattern of the electrode active material before heat treatment that was obtained by these measurements is shown in FIG. 2.

EXAMPLE 2

Figure 3:
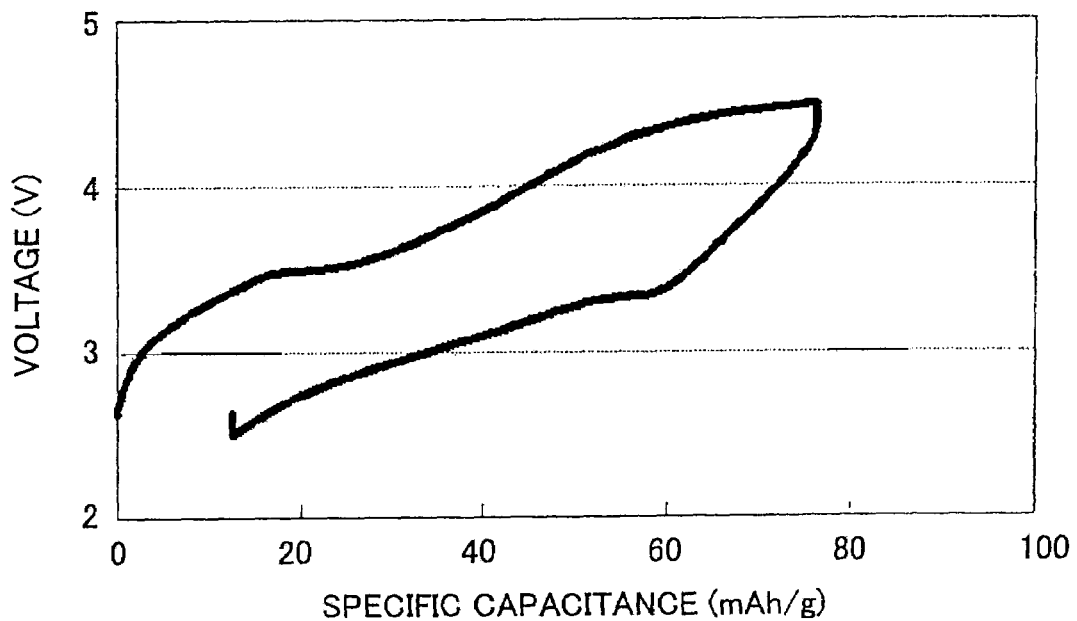
FIG. 3 is a property diagram showing the charge and discharge properties of a lithium secondary battery obtained by Example 2.

A test coin cell was manufactured using the electrode active material after heat treatment that was obtained by Example 1. That is, ketjen black as the conducting material and polytetrafluoroethylene (PTFE) as the binder were mixed together at a mass ratio of electrode active material: conducting material (i.e., ketjen black): binder (PTFE)=70:25:5. A test electrode was then manufactured using this mixture. Metal Li was used as the counter electrode and a polyethylene (PE) separator (Ube Industries, Ltd.) was used for the separator. Also, for the electrolyte solution, $LiPF_6$ was dissolved at a concentration of 1 mol/liter in a mixed solvent with a volume ratio of 3:3:4 of ethylene carbonate (EC), ethyl methyl carbonate (EMC), and dimethyl carbonate (DMC). The test coin cell was manufactured using these constituent elements. Charging and discharging with a current value of 150 μA within a voltage range of 2.5 to 4.5V was then repeatedly performed with this test coin cell. The results from charging and discharging five times are shown in FIG. 3.

COMPARATIVE EXAMPLE 2

Figure 4:
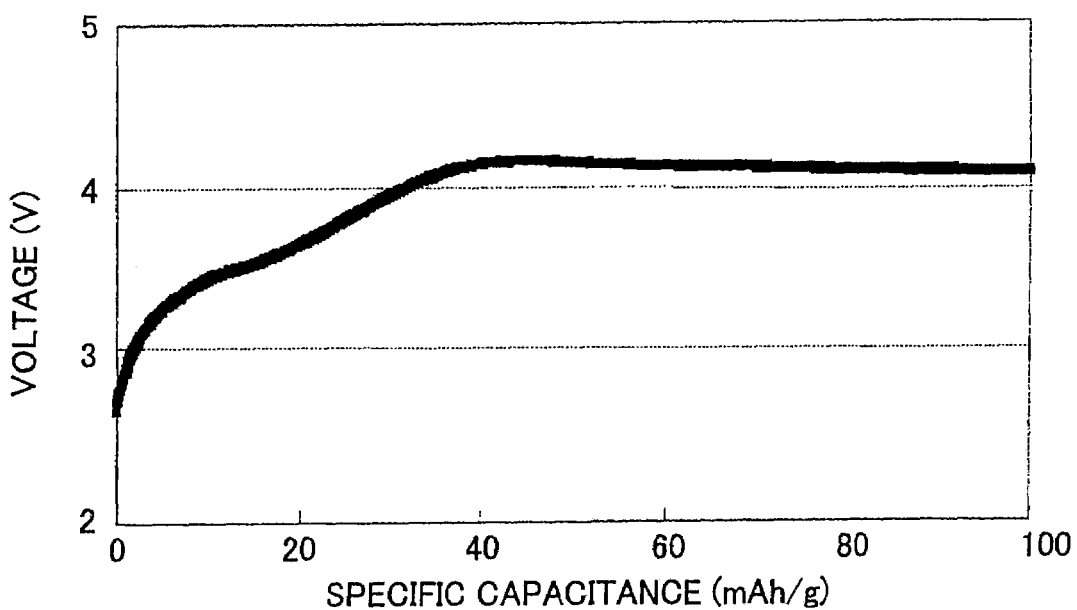
FIG. 4 is a property diagram showing the charge and discharge properties of a lithium secondary battery obtained by Comparative example 2.

A test coil cell was manufactured using the electrode active material before heat treatment that was obtained by Comparative example 1. The constituent elements of the test cell and the measuring conditions are the same as those in Example 2. The results are shown in FIG. 4.

EXAMPLE 3

LiOH as the Li raw material, FeO as the Fe raw material, and $P_2O_5$ as the P raw material were mixed together at a molar ratio of 1:1:0.75. This mixture was then melted for 15 minutes at 1100° C. in an Ar atmosphere and then cooled slowly to obtain crystalline electrode active material in which a $Li_3PO_4$ phase is mixed in with a crystalline iron-phosphate complex having a $Li_xFeP_yO_z$ composition.

Figure 5:
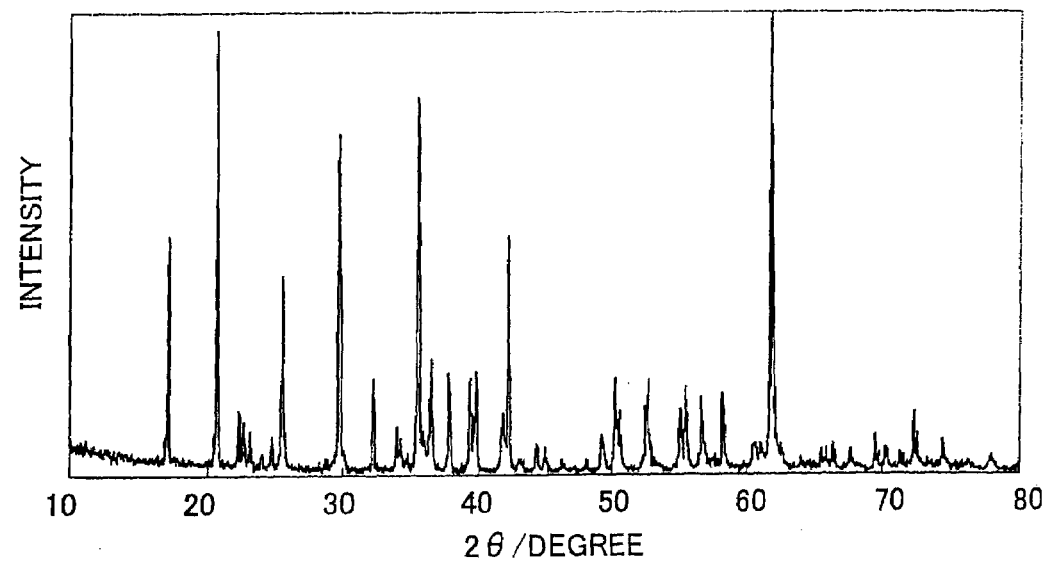
FIG. 5 is an XRD pattern of electrode active material obtained by Example 3.

Next, the X-ray diffraction pattern of the obtained crystalline electrode active material was then measured under the same conditions as those in Example 1. The X-ray diffraction pattern of the electrode active material that was obtained by those measurements is shown in FIG. 5.

COMPARATIVE EXAMPLE 3

LiOH as the Li raw material, FeO as the Fe raw material, and $P_2O_5$ as the P raw material were mixed together at a molar ratio of 1:1:1. This mixture was then melted for 15 minutes at 1100° C. in an Ar atmosphere and then cooled slowly to obtain crystalline electrode active material having a $Li_xFeP_yO_z$ composition.

Figure 6:
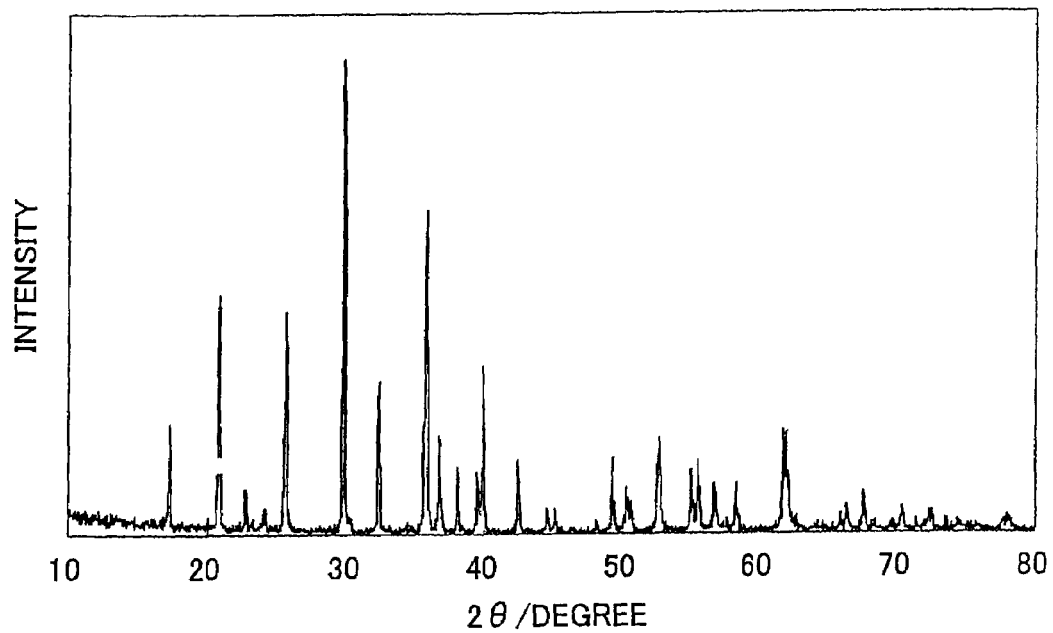
FIG. 6 is an XRD pattern of electrode active material obtained by Comparative example 3.

Next, the X-ray diffraction pattern of the obtained crystalline-electrode active material was then measured under the same conditions as those in Example 1. The X-ray diffraction pattern of the electrode active material that was obtained by those measurements is shown in FIG. 6.

EXAMPLE 4

A test coin cell was manufactured using the electrode active material that was obtained by Example 3. The constituent elements of the test coin cell are the same as those in Example 2. Charging and discharging with a current value of 150 μA within a voltage range of 2.5 to 5V was then repeatedly performed with this test coin cell. The results are shown in FIG. 7.

COMPARATIVE EXAMPLE 4

A test coin cell was manufactured using the electrode active material that was obtained by Example 3. The constituent elements of the test coin cell are the same as those in Example 2 and the measurement conditions were the same as those in Example 4.

Figure 7:
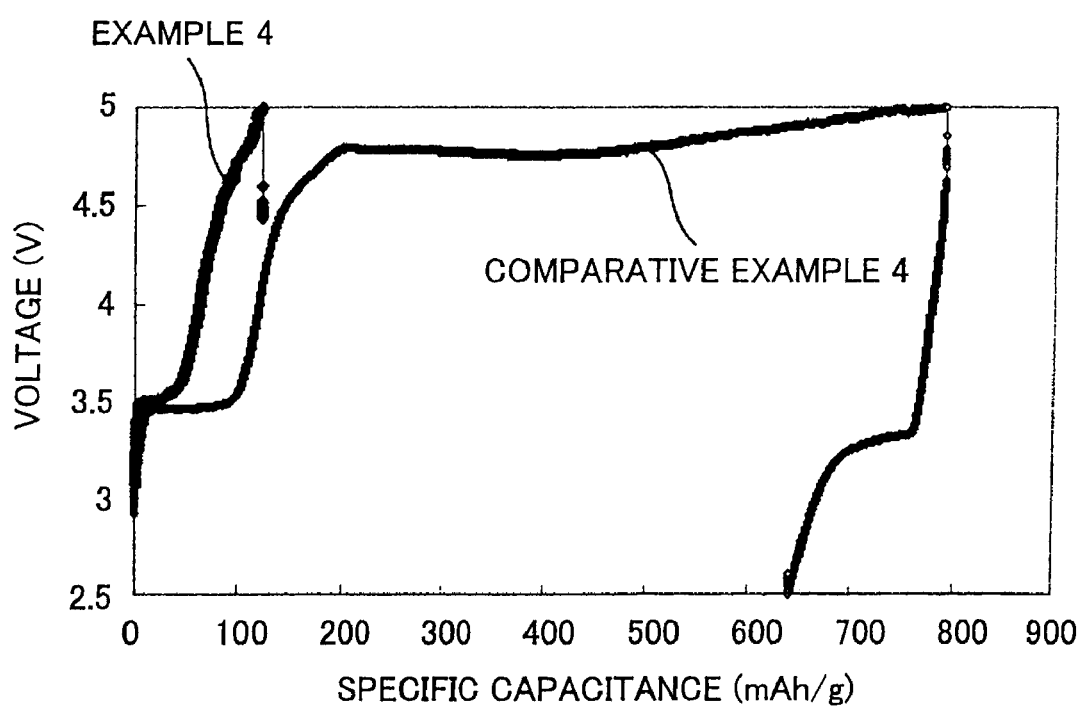
FIG. 7 is a property diagram showing the charge and discharge properties of lithium secondary batteries obtained by Example 4 and Comparative example 4.

The results are shown in FIG. 7.

RESULTS

The following is evident from the results shown in FIGS. 1 to 7. As shown in FIG. 1, the electrode active material obtained with Example 1 confirms that a $Li_3PO_4$ crystalline phase and a $LiFePO_4$ crystalline phase with an olivine structure are mixed in with amorphous material. On the other hand, as shown in FIG. 2, the electrode active material obtained with Comparative example 1 shows only X-ray diffuse scattering specific to amorphous material so crystalline material was not confirmed, only amorphous material was confirmed. Also, as shown in FIG. 3, in Example 2, a $Li_3PO_4$ crystalline phase is mixed in with the amorphous iron-phosphate complex so even when charging and discharging was repeated 5 times within the high voltage range of 2.5 to 4.5V, an irreversible reaction with the electrolyte solution was inhibited so the degradation reaction of the electrolyte solution was able to be reduced. As a result, reversible charging and discharging was possible. On the other hand, as shown in FIG. 4, with Comparative example 2, a $Li_3PO_4$ crystalline phase is not mixed in with the amorphous iron-phosphate complex so when charging and discharging was performed 5 times within the high voltage range of 2.5 to 4.5V, the irreversible reaction was not inhibited so the degradation reaction of the electrolyte solution was not able to be reduced. As a result, reversible charging and discharging was not possible. Also, as shown in FIG. 5, the electrode active material obtained with Example 3 confirms that a $Li_3PO_4$ crystalline phase is mixed in with a $LiFePO_4$ crystalline phase with an olivine structure which is a crystalline iron-phosphate complex. On the other hand, as shown in FIG. 6, the electrode active material obtained with Comparative example 3 confirms that only a $LiFePO_4$ crystalline phase with an olivine structure formed. Also, as shown in FIG. 7, with Example 4, it was confirmed that mixing the $Li_3PO_4$ crystalline phase into a $LiFePO_4$ crystalline phase with an olivine structure which is a crystalline iron-phosphate complex inhibits the degradation reaction of the electrolyte solution such that it can be used even with a high voltage of 5V. With Comparative example 4, on the other hand, it was confirmed that a degradation reaction of the electrolyte solution occurred because a $Li_3PO_4$ crystalline phase is not mixed in with the $LiFePO_4$ crystalline phase having an olivine structure which is a crystalline iron-phosphate complex so it is unable to be used at a high voltage of 5V. From these results it was confirmed that with Examples 2 and 4, which used the electrode active material of the invention, an irreversible reaction is able to be suppressed which reduces the irreversible capacity, thereby enabling a high capacity to be maintained even when it is used at a high potential.

The invention claimed is:
1. Electrode active material comprising:
an amorphous iron-phosphate complex having a $Li_xFeP_yO_z$ composition; and
a $Li_3PO_4$ phase that is mixed in with the amorphous iron-phosphate complex.
2. The electrode active material according to claim 1, wherein relative proportions of the $Li_xFeP_yO_z$ are specified to be $0 \leq x \leq 2$, $0 \leq y \leq 2$, $1 \leq z \leq 7.5$.
3. The electrode active material according to claim 1, wherein relative proportions of the $Li_xFeP_yO_z$ are specified to be $0 \leq x \leq 2$, $0 \leq y \leq 2$, $1 \leq z \leq 7$.
4. The electrode active material according to claim 1, wherein an amount of the $Li_3PO_4$ phase is included in $0 < Li_3PO_4 < 10$ percent by mass.
5. A high voltage nonaqueous electrolyte secondary battery comprising:
the electrode active material according to claim 1.
6. Electrode active material comprising:
at least one of a $LiFePO_4$ crystalline iron-phosphate complex and a $Li_3Fe_2(PO_4)_3$ crystalline iron-phosphate complex; and
a $Li_3PO_4$ phase that is mixed in with the crystalline iron-phosphate complex.

7. The electrode active material according to claim 6, wherein an amount of the $Li_3PO_4$ phase is included in $0 < Li_3PO_4 < 10$ percent by mass.

8. An electrode active material manufacturing method comprising:
  obtaining an amorphous iron-phosphate complex by rapidly cooling a melt having a $Li_xFeP_yO_z$ composition; and
  crystallizing a $Li_3PO_4$ phase by heat treating the amorphous iron-phosphate complex within a temperature range from a glass transition temperature to a crystallization temperature.

9. A manufacturing method of electrode active material having as a main constituent a crystalline iron-phosphate complex that used a melt having a $Li_xFeP_yO_z$ composition, comprising:
  adjusting the melt such that a composition of the melt is off from a stoichiometric composition; and
  crystallizing a $Li_3PO_4$ phase by slowly cooling the melt.

* * * * *